US012673645B2

(12) United States Patent
Yuki et al.

(10) Patent No.: US 12,673,645 B2
(45) Date of Patent: Jul. 7, 2026

(54) ROAD SURFACE TYPE DETECTION DEVICE

(71) Applicant: HITACHI ASTEMO, LTD., Hitachinaka (JP)

(72) Inventors: Fumio Yuki, Hitachinaka (JP); Takeo Hosokawa, Hitachinaka (JP); Atsuo Soma, Hitachinaka (JP); Tatsuhiko Monji, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 79 days.

(21) Appl. No.: 18/724,247

(22) PCT Filed: Feb. 14, 2022

(86) PCT No.: PCT/JP2022/005758
§ 371 (c)(1),
(2) Date: Jun. 26, 2024

(87) PCT Pub. No.: WO2023/152986
PCT Pub. Date: Aug. 17, 2023

(65) Prior Publication Data
US 2025/0222909 A1 Jul. 10, 2025

(51) Int. Cl.
*B60T 8/1763* (2006.01)
*B60T 8/171* (2006.01)
(Continued)

(52) U.S. Cl.
CPC ............ *B60T 8/1763* (2013.01); *B60T 8/171* (2013.01); *B60T 8/172* (2013.01); *G01B 7/34* (2013.01); *G01L 1/22* (2013.01); *B60T 2210/10* (2013.01)

(58) Field of Classification Search
CPC ......... G01L 1/22; G01B 7/34; B60T 2210/10; B60T 8/171; B60T 8/172; B60T 8/1763
See application file for complete search history.

(56) References Cited

U.S. PATENT DOCUMENTS 7,406,863 B2 * 8/2008 Ogawa .................. B60T 8/1725
73/146
7,546,764 B2 * 6/2009 Morinaga ............. B60C 23/064
73/146
(Continued)

FOREIGN PATENT DOCUMENTS

JP 2002-002472 A 1/2002
JP 2005-345238 A 12/2005
(Continued)

OTHER PUBLICATIONS

International Search Report with English Translation and Written Opinion of International Patent Application No. PCT/JP2022/005758 dated Mar. 22, 2022 (12 pages).
(Continued)

*Primary Examiner* — Carl C Staubach
(74) *Attorney, Agent, or Firm* — Foley & Lardner LLP

(57) ABSTRACT

Provided is a road surface type detection device capable of distinguishing an asphalt reference road surface type from other road surface types in real time from comparison of magnitudes and frequencies of strain sensor signal waveforms that are excellent for information detection in a low-speed range. A road surface type detection device 10 that estimates a plurality of road surface types (asphalt, a gravel road, a grass road) includes at least one sensor element 1, 2, 3 that detects a physical amount of a vehicle, a road surface type estimation unit 4, and a storage unit 411 that stores output values of the sensor element 1, 2, 3 corresponding to the plurality of road surface types. Any one road surface type asphalt, a gravel road, a grass road) is estimated out of the plurality of road surface types on the basis of a magnitude of a waveform of a sensor signal output by the sensor element 1, 2, 3. It is thus possible to distinguish asphalt from other road surface types in real time.

6 Claims, 13 Drawing Sheets

(51) Int. Cl.
    *B60T 8/172*       (2006.01)
    *G01B 7/34*        (2006.01)
    *G01L 1/22*        (2006.01)

(56)           References Cited

U.S. PATENT DOCUMENTS

| | | | | |
|---|---|---|---|---|
| 7,856,893 | B2 * | 12/2010 | Ozaki | F16C 19/522 |
| | | | | 73/862.321 |
| 8,983,749 | B1 * | 3/2015 | Singh | B60T 8/172 |
| | | | | 701/71 |
| 9,815,343 | B1 * | 11/2017 | Laflamme | B60C 23/064 |
| 11,161,378 | B2 * | 11/2021 | Phillips | B60C 23/0406 |
| 11,835,421 | B2 * | 12/2023 | Ferry | G01L 17/00 |
| 2007/0251619 | A1 * | 11/2007 | Bertrand | B60C 23/064 |
| | | | | 152/152.1 |
| 2008/0103659 | A1 * | 5/2008 | Mancosu | B60W 40/101 |
| | | | | 701/41 |
| 2011/0118989 | A1 * | 5/2011 | Morinaga | B60C 11/24 |
| | | | | 702/34 |
| 2011/0191036 | A1 * | 8/2011 | Wang | G01L 5/20 |
| | | | | 702/42 |
| 2017/0305421 | A1 | 10/2017 | Sekizawa et al. | |
| 2018/0222458 | A1 | 8/2018 | Suzuki et al. | |
| 2022/0371382 | A1 * | 11/2022 | Ishizuki | B60C 23/0486 |
| 2023/0375340 | A1 * | 11/2023 | Isoya | G01B 21/32 |
| 2023/0406048 | A1 * | 12/2023 | Nishiyama | G01L 1/04 |
| 2024/0053229 | A1 * | 2/2024 | Yuki | B60C 23/0488 |
| 2024/0416927 | A1 * | 12/2024 | Yuki | B60W 40/105 |
| 2025/0153520 | A1 * | 5/2025 | Hosokawa | B60W 40/12 |

FOREIGN PATENT DOCUMENTS

| | | |
|---|---|---|
| JP | 2008-143312 A | 6/2008 |
| JP | 2016-088429 A | 5/2016 |
| JP | 2017-081380 A | 5/2017 |

OTHER PUBLICATIONS

International Preliminary Report on Patentability issued in corresponding International Application No. PCT/JP2022/005758, dated Aug. 29, 2024 (8 pages).

* cited by examiner

SENSOR SIGNAL WAVEFORM 15

A

SENSOR SIGNAL WAVEFORM 15 IN ONE CYCLE

FIG. 6

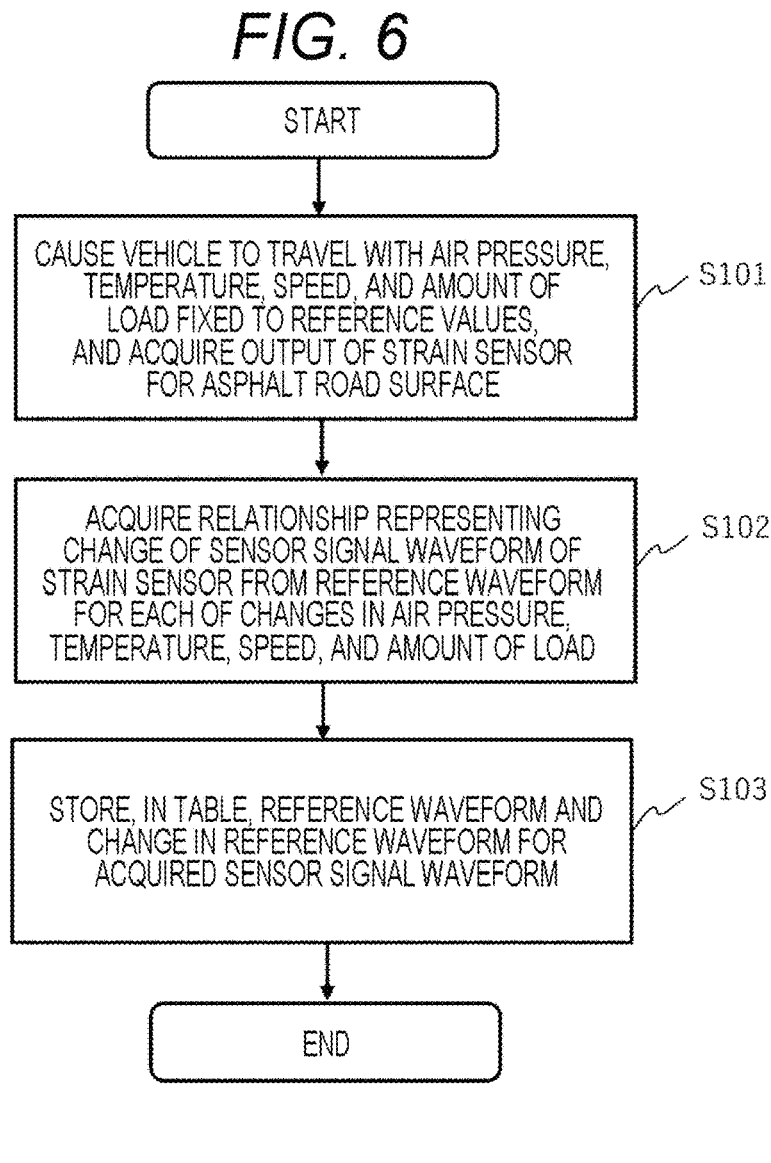

START

CAUSE VEHICLE TO TRAVEL WITH AIR PRESSURE, TEMPERATURE, SPEED, AND AMOUNT OF LOAD FIXED TO REFERENCE VALUES, AND ACQUIRE OUTPUT OF STRAIN SENSOR FOR ASPHALT ROAD SURFACE — S101

ACQUIRE RELATIONSHIP REPRESENTING CHANGE OF SENSOR SIGNAL WAVEFORM OF STRAIN SENSOR FROM REFERENCE WAVEFORM FOR EACH OF CHANGES IN AIR PRESSURE, TEMPERATURE, SPEED, AND AMOUNT OF LOAD — S102

STORE, IN TABLE, REFERENCE WAVEFORM AND CHANGE IN REFERENCE WAVEFORM FOR ACQUIRED SENSOR SIGNAL WAVEFORM — S103

END

FIG. 7

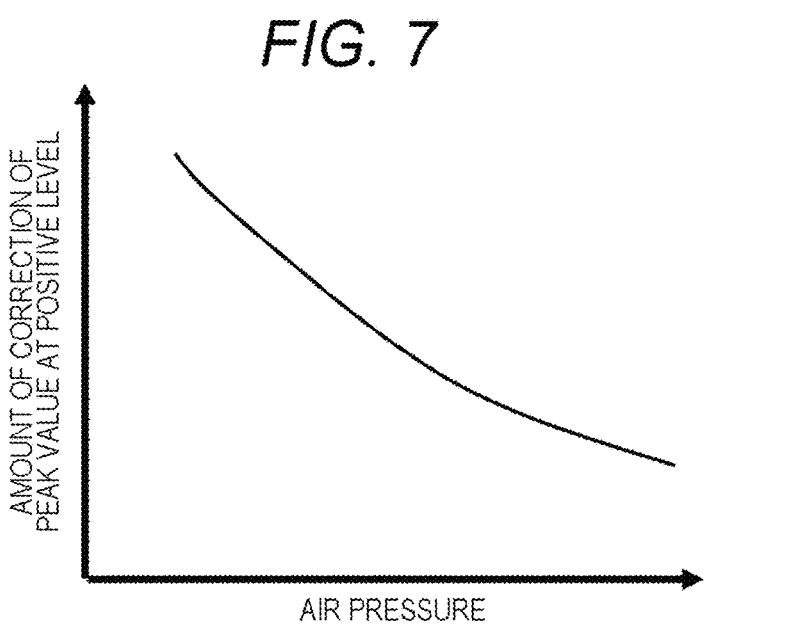

AMOUNT OF CORRECTION OF PEAK VALUE AT POSITIVE LEVEL

AIR PRESSURE

FIG. 13

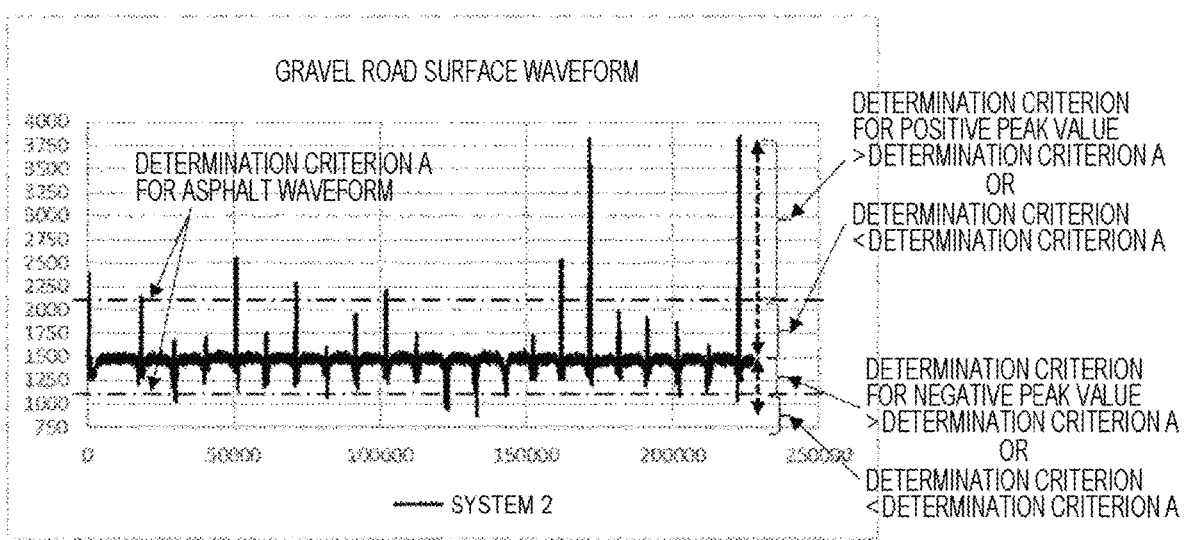

ROAD SURFACE DETERMINATION CONDITIONS
① POSITIVE OR NEGATIVE PEAK IS GREATER OR SMALLER THAN DETERMINATION CRITERION A
② REPEATED DETECTION = ONCE
⇒ IT IS POSSIBLE TO MAKE DETERMINATION OF GRAVEL ROAD

FIG. 14

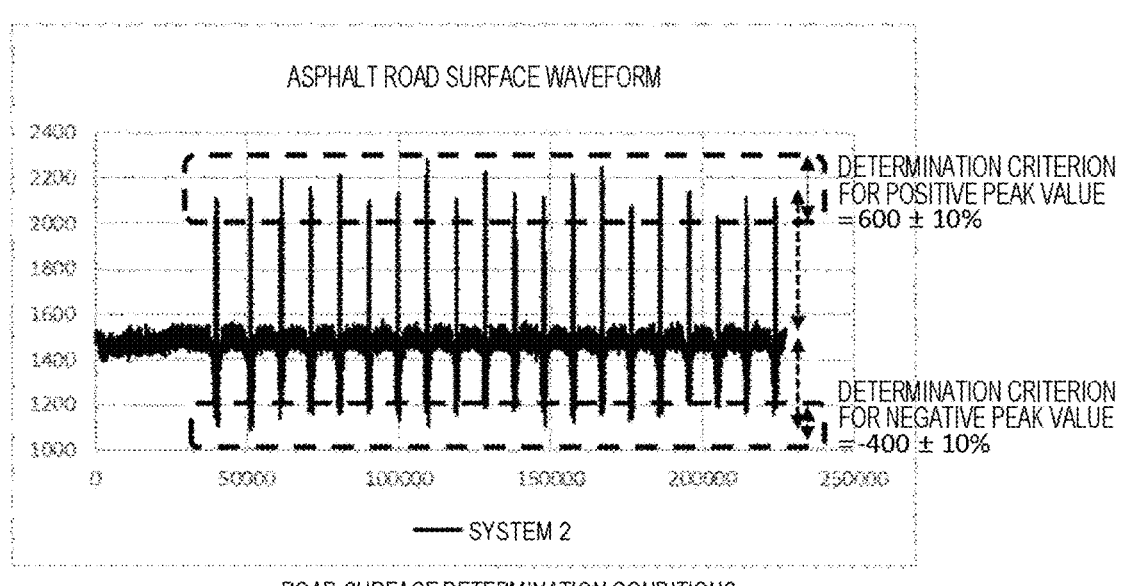

ROAD SURFACE DETERMINATION CONDITIONS
① POSITIVE OR NEGATIVE PEAK VALUE DETECTION
② REPEATED DETECTION = FIVE TIMES IN SUCCESSION
⇒ IT IS POSSIBLE TO MAKE DETERMINATION OF ASPHALT ROAD SURFACE

20 BRAKE CONTROL SYSTEM

ROAD SURFACE TYPE DETECTION DEVICE

TECHNICAL FIELD

The present invention relates to a driving safety support device for a vehicle, and particularly to a road surface type detection device for improving the accuracy of controlling a brake system and the like.

BACKGROUND ART

In recent years, tire sensor technologies for detecting how slippery road surfaces are, loads applied to tires, and the like on the basis of information obtained from the tires have been actively developed in order to provide safer traveling states to realize automatic driving. This is because accidents caused by insufficient control of a brake and the like can be prevented before anything happens by providing safer traveling states. In order to construct such a safe control system, it is necessary to provide a braking force with which tires are not locked and to precisely detect a road surface type to distinguish an asphalt-paved road from a gravel road. A tire strain sensor can detect a load or the like acting on tires by detecting tire strain deformation. An improvement in traveling safety through prevention of vehicle problems before anything happens and detection of traveling and road surface states is thus expected.

As a conventional technology of such a detection device, there is PTL 1.

An object of PTL 1 is "to provide a lane keep control system capable of appropriately detecting a road surface state or a road surface u of a traveling road surface of a vehicle and more appropriately performing lane keep control in accordance with a detection result", and PTL 1 describes a technology in which "a tire-side device 1 and a vehicle-side device 2 configure a road surface state estimation device, such that a road surface state can be grasped on the basis of road surface state data sent from the tire-side device 1; in this manner, it is possible to appropriately detect a road surface state or a road surface u of a traveling road surface of a vehicle and to more appropriately perform lane keep control in accordance with a detection result; in particular, the tire-side device 1 estimates the road surface state by detecting vibration of grounding surfaces of tires, and it is thus possible to more accurately estimate the road surface state; therefore, it is possible to more appropriately perform lane keep control."

In other words, an output vibration waveform of a vibration detection device (acceleration sensor) is frequency-analyzed, and detection of a gravel road as a state of a road surface is also enabled in accordance with how large/small the integral quantity of an output level is.

CITATION LIST

Patent Literature

PTL 1: JP 2016-88429 A

SUMMARY OF INVENTION

Technical Problem

According to the technology described in PTL 1, an output vibration waveform of the vibration detection device (acceleration sensor) is frequency analyzed, and a road surface state is detected depending on how large/small the integral quantity of an output level is. However, a vehicle speed of equal to or greater than 30 km/h is typically needed in order to acquire an effective vibration waveform from the acceleration sensor, and road surface type detection in a low-speed range is not taken into consideration.

Also, since the amount of data to be processed in the frequency analysis of a vibration waveform is typically large, there is thus a concern that it takes time to perform logical operation processing, and real-time road surface type detection is not taken into consideration.

In view of the above circumstances, an object of the present invention is to provide a road surface type detection device capable of distinguishing an asphalt reference road surface type from other road surface types (such as a gravel road) in real time from comparison of magnitudes and frequencies of strain sensor signal waveforms that are excellent for information detection in a low-speed range.

Solution to Problem

In order to achieve the above object, the present invention is configured as follows. A road surface type detection device that estimates a plurality of road surface types includes: at least one sensor element that detects a physical amount of a vehicle; a road surface type estimation unit; and a storage unit that stores output values of the sensor element corresponding to the plurality of road surface types, and any one road surface type is estimated out of the plurality of road surface types on the basis of a magnitude of a waveform of a sensor signal output by the sensor element. Also, a brake control system includes: a road surface type detection device that includes at least one sensor element that detects a physical amount of a vehicle, a road surface type estimation unit, and a storage unit that stores output values of the sensor element corresponding to the plurality of road surface types, the road surface type detection device estimating any one road surface type out of the plurality of road surface types on the basis of a magnitudes of a waveform of a sensor signal output by the sensor element; and a brake control device that includes a braking condition determination unit that determines a braking condition of the vehicle on the basis of the road surface type estimated by the road surface detection device, the brake control device controlling a braking force of the vehicle.

Advantageous Effects of Invention

It is possible to provide a road surface type detection device capable of distinguishing an asphalt reference road surface type from other road surface types (such as a gravel road) in real time from comparison of magnitudes and frequencies of strain sensor signal waveforms that are excellent for information detection in a low-speed range.

Problems, configurations, and advantages other than those described above will become apparent from the following description of embodiments.

BRIEF DESCRIPTION OF DRAWINGS

FIG. 6 is a flowchart for deriving a table of parameters that coexist in a sensor signal waveform of the strain sensor according to the first embodiment.

FIG. 7 is an explanatory diagram illustrating an air pressure correlation table which is a table illustrating a correlation between a peak value at a positive level of a sensor signal waveform of the strain sensor and an air pressure according to the first embodiment.

FIG. 13 is a graph illustrating a result of verifying whether or not the road surface type estimation flowchart is possible on the basis of an actually measured sensor signal waveform of a gravel road from the strain sensor according to the first embodiment.

FIG. 14 is a graph illustrating a result of verifying whether or not the road surface type estimation flowchart is possible on the basis of an actually measured sensor signal waveform of an asphalt road surface from the strain sensor according to the first embodiment.

DESCRIPTION OF EMBODIMENTS

Figure 1:
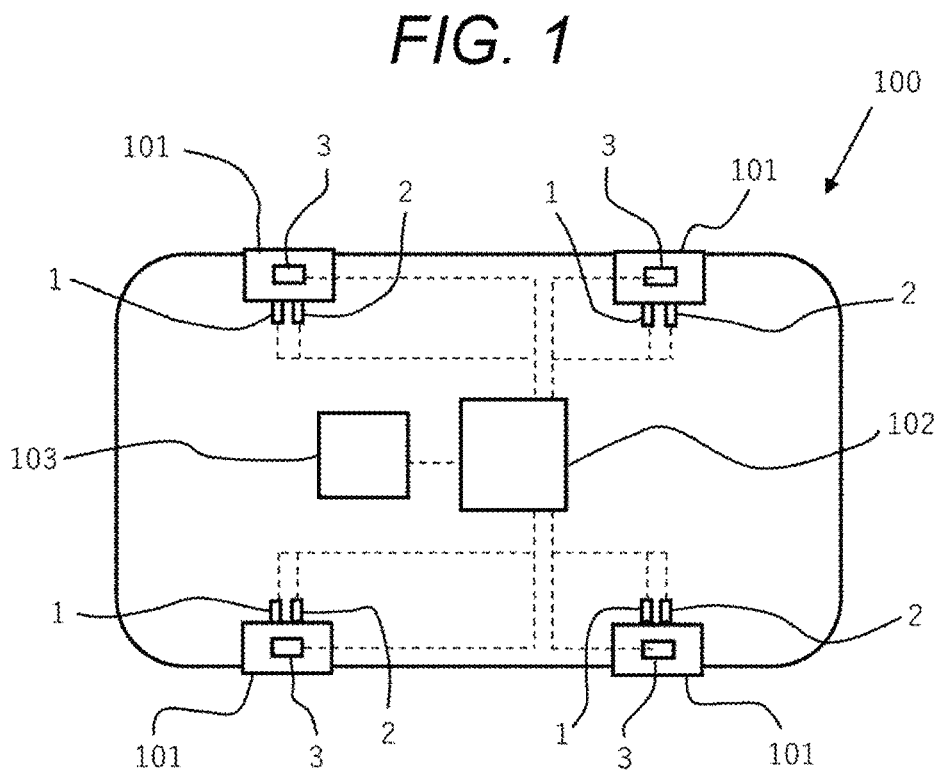
FIG. 1 is a configuration diagram illustrating a vehicle in which a road surface type detection device according to a first embodiment is mounted.

Hereinafter, embodiments of the present invention will be described in detail on the basis of the drawings. Note that the same members will be denoted by the same reference signs in principle throughout the drawings for explaining the embodiments, and repeated description thereof will be omitted. The present invention is not intended to be interpreted in a limited manner to described content of the embodiments described below. Those skilled in the art will easily understand that specific configurations thereof can be modified without departing from the idea and the gist of the present invention.

Notations of "first", "second", "third", and the like in the specification and the like are applied to identify components and are not necessarily intended to limit the number or the orders. Also, the numbers for identifying the components are used in each context, and numbers used in one context do not necessarily indicate the same configurations in another context. Moreover, components identified by certain numbers are not prevented from also functioning as components identified by other numbers.

The position, the size, the shape, the range, and the like of each configuration in the drawings and the like may not represent an actual position, size, shape, range, and the like for easy understanding of the invention. Therefore, the present invention is not necessarily limited to the positions, the sizes, the shapes, the ranges, and the like disclosed in the drawings and the like.

Components represented in singular in the specification include those in plural unless otherwise explicitly indicated in the context.

EMBODIMENTS

First Embodiment

<Overall Configuration of Vehicle>

FIG. 1 is a schematic configuration diagram illustrating a vehicle 100 in which a road surface type detection device 10 according to a first embodiment of the present invention is mounted.

As illustrated in FIG. 1, the vehicle 100 includes four tires 101, one ECU 102, and one report unit 103. The vehicle 100 includes four air pressure sensors 1, four temperature sensors 2, and four strain sensors 3. Note that the vehicle 100 is not limited to a four-wheeled vehicle and may be a two-wheeled vehicle traveling on a road surface 20 (illustrated in FIG. 3).

The vehicle 100 travels on the road surface 20 through rotation of the four tires 101. Persons board the vehicle 100.

The tires 101 are grounded on the road surface 20 and receive a load of the vehicle 100. The tires 101 rotate. The tires 101 are rubber members.

The ECU 102 is a control unit that controls the vehicle 100. The ECU 102 includes an operation processing unit, a storage unit, and an input/output port that is electrically connected to various sensors, the operation processing unit such as a CPU, a storage unit such as a memory, and a report unit 103.

The report unit 103 is a monitor of a car navigation system. A display screen of the report unit 103 is switched between a car navigation screen and a road surface type report screen through interruption processing from the ECU 102. Display of the display screen of the report unit 103 is controlled on the basis of control performed by the ECU 102.

Each air pressure sensor 1 acquires an air pressure of one tire 101 and outputs the air pressure to the ECU 102. Each temperature sensor 2 acquires a temperature of one tire 101 and outputs the temperature to the ECU 102. Each strain sensor 3 that is a sensor element acquires a sensor signal waveform 15 (illustrated in FIG. 3) at each tire 101 and outputs the sensor signal waveform 15 to the ECU 102.

<Road Surface Type Detection Device 10>

Figure 2:
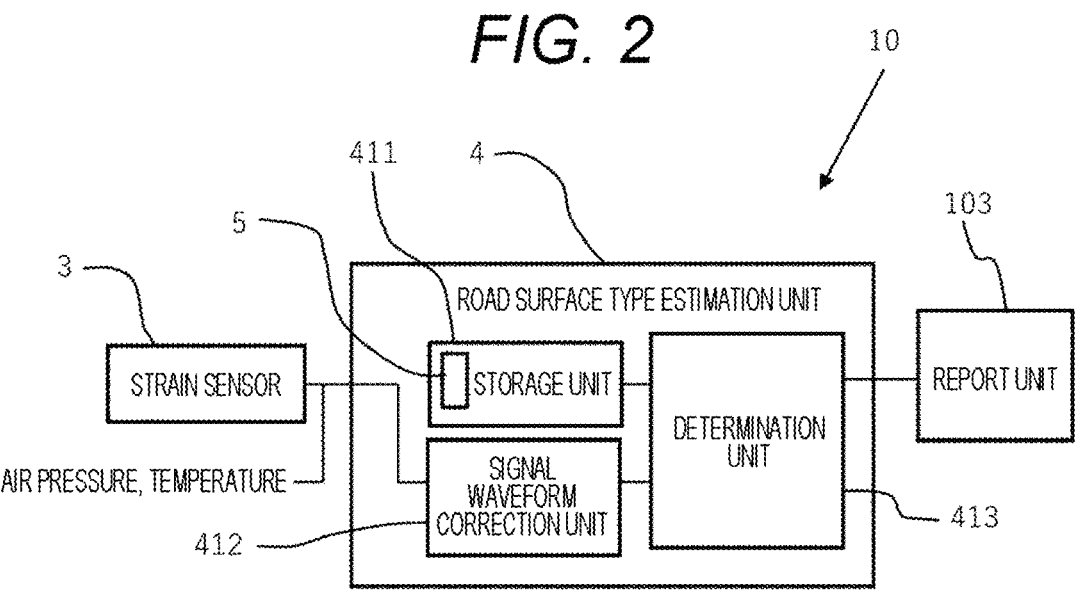
FIG. 2 is a configuration diagram illustrating the road surface type detection device according to the first embodiment.

FIG. 2 is a configuration diagram illustrating the road surface type detection device 10 according to the first embodiment.

In FIG. 2, the road surface type detection device 10 relates to a driving safety support device for the vehicle 100 and provides a safe traveling state to thereby prevent accidents caused by insufficient control of a brake before anything happens, in particular.

The road surface type detection device 10 is a device that detects a road surface type that affects gripping forces of the tires 101 attached to the vehicle 100.

As illustrated in FIG. 2, the road surface type detection device 10 includes the strain sensors 3, a road surface type estimation unit 4, and the report unit 103. The road surface type detection device 10 detects a road surface type on the basis of an output signal waveform.

<Strain Sensor 3>

The strain sensors 3 are sensor elements. The strain sensors 3 are semiconductors and provide outputs after conversion into strain amounts in accordance with changes in resistances. One strain sensor 3 is disposed in each tire 101. Each strain sensor 3 outputs the sensor signal waveform 15 (illustrated in FIG. 3) including a reference level 151 (illustrated in FIG. 3), a positive level that changes on a positive side relative to the reference level 151, and a negative level that changes on a negative side relative to the reference level 151.

<Road Surface Type Estimation Unit 4>

As for the road surface type estimation unit 4, functions of the road surface type estimation unit 4 are exhibited by a program in the ECU 102 being executed. The road surface type estimation unit 4 receives a sensor signal waveform 15 output by the strain sensors 3.

The road surface type estimation unit 4 acquires air pressures of the tires 101 from the air pressure sensors 1. The road surface type estimation unit 4 acquires temperatures of the tires 101 from the temperature sensors 2. The road surface type estimation unit 4 acquires a speed by dividing a tire outer periphery by an output cycle time of the sensor signal waveform 15.

Note that the road surface type estimation unit 4 may acquire the speed from a speed sensor or the like. The road surface type estimation unit 4 corrects the sensor signal waveform output by the strain sensors 3 in accordance with conditions of parameters such as acquired air pressures, temperatures, speeds, and amounts of load, and estimates the road surface type from a difference between a correction signal and a reference waveform held in a storage unit 411. The road surface type estimation unit 4 transmits the estimated road surface type to the report unit 103.

The road surface type estimation unit 4 includes the storage unit 411, a signal waveform correction unit 412, and a determination unit 413.

The storage unit 411 stores output values of the sensor elements 3 and the like corresponding to the plurality of road surface types. The storage unit 411 includes a reference waveform (a peak value at a positive level, a peak value at a negative level) acquired under reference conditions (an air pressure, a temperature, a speed, a load) for asphalt as a road surface type of the sensor signal waveform 15 output by the strain sensors 3 and a change amount table 5 for an amount of change for each of sets of parameter conditions.

The signal waveform correction unit 412 corrects, from values in the change amount table 5 stored in the storage unit 411, the air pressure, the speed, the temperature, and the amount of load which are parameters of mixed signals mixed in the sensor signal waveform 15 to achieve a signal waveform under predetermined conditions such that differences of the air pressure, the speed, the temperature, and the amount of load from those of the reference conditions are cancelled out, and causes the corrected signal waveform to be transmitted to the determination unit 413.

The determination unit 413 compares a corrected peak value 152 (illustrated in FIG. 3) at a positive level and a corrected peak value 153 (illustrated in FIG. 3) at a negative level transmitted by the signal waveform correction unit 412 with the reference waveform kept in the change amount table 5 stored in the storage unit 411, makes a determination of an asphalt road surface in a case in which the peak value 152 and the peak value 153 are equivalent to those of the reference waveform, or makes a determination of a gravel road or the like other than the asphalt in a case in which peak value 152 and the peak value 153 are greater than or smaller than those of the reference waveform. The determination unit 423 transmits the estimated road surface type to the report unit 103.

<Sensor Signal Waveform 15>

Figure 3:
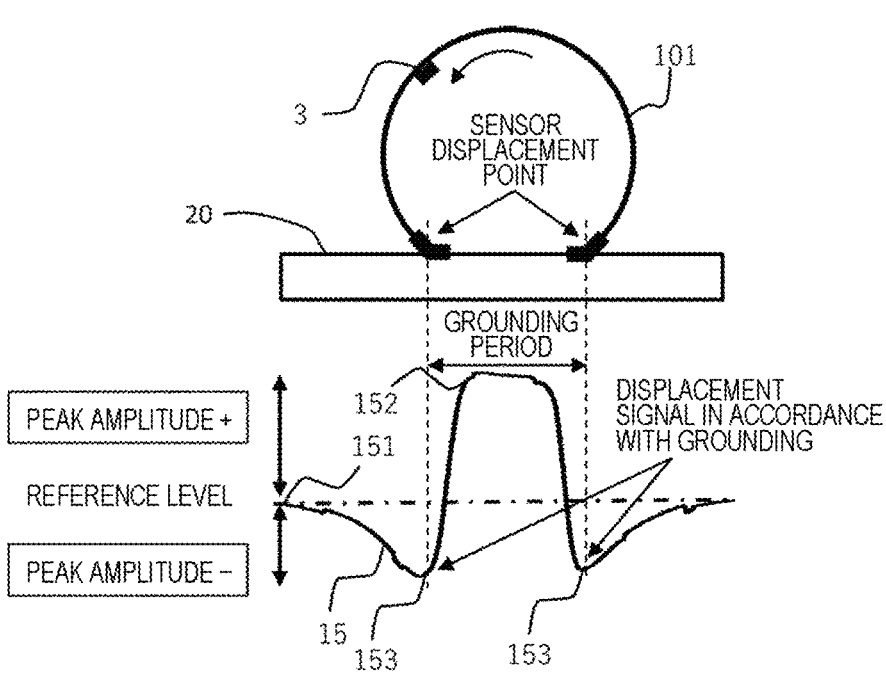
FIG. 3 is an explanatory diagram illustrating a sensor signal waveform of a strain sensor in accordance with a tire rotation state according to the first embodiment.

FIG. 3 is an explanatory diagram illustrating the sensor signal waveform 15 of the strain sensor 3 in accordance with a rotation state of the tire 101 according to the first embodiment. As illustrated in FIG. 3, the strain sensor 3 disposed inside the tire 101 outputs the sensor signal waveform 15 that changes in accordance with a state of the rotating tire 101.

The strain sensor 3 outputs the sensor signal waveform 15 that includes a reference level 151, a positive level at which a change on the positive side relative to the reference level 151 is made, and a negative level at which a change on the negative side relative to the reference level 151 is made.

The strain sensor 3 maintains the reference level 151 of the sensor signal waveform 15 when it is not grounded. The strain sensor 3 outputs the peak value 152 at the positive level of the sensor signal waveform 15 in a state in which the tire 101 is grounded on the road surface 20. The strain sensor 3 outputs the peak value 153 at the negative level of the sensor signal waveform 15 at a moment at which the tire 101 is grounded on or is separated from the road surface 20.

Here, the moment at which the tire 101 is grounded on or is separated from the road surface 20 is a sensor displacement point. A period between two sensor displacement points is a grounded period during which the tire 101 is grounded on the road surface 20.

In this manner, the detected sensor signal waveform 15 changes depending on various physical amounts (the amount of load, the air pressure, the speed, the temperature).

Figure 4:
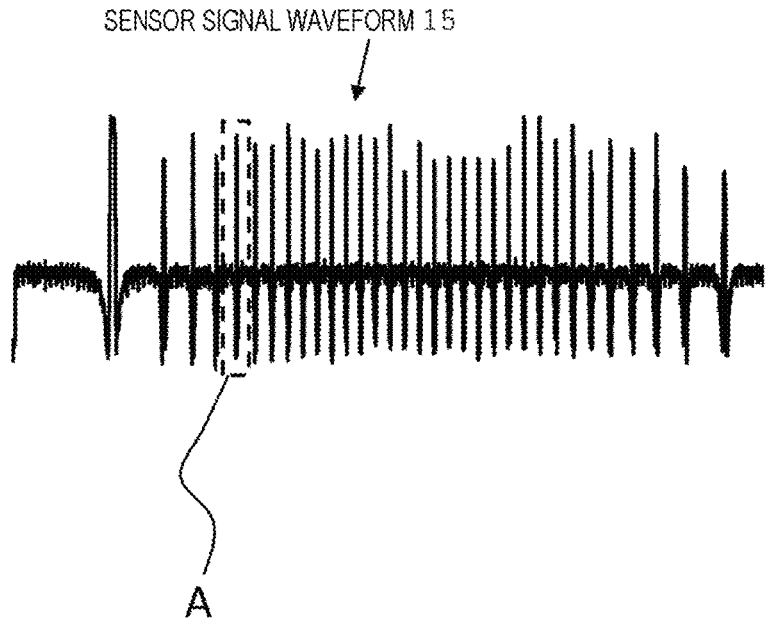
FIG. 4 is a waveform diagram illustrating a sensor signal waveform of the strain sensor in accordance with a tire rotation state according to the first embodiment.

FIG. 4 is a waveform diagram illustrating the sensor signal waveform 15 of the strain sensor 3 in accordance with the rotation state of the tire 101 according to the first embodiment.

As illustrated in FIGS. 4 and 3, the tire 101 is rotating, and the sensor signal waveform 15 of the strain sensor 3 repeats the reference level 151, the negative level at which a change on the negative side relative to the reference level 151 is made, the positive level at which a change on the positive side relative to the reference level 151 is made, and the negative level at which a change on the negative side relative to the reference level 151 is made in turn.

A signal value of the sensor signal waveform 15 can be represented by a signal amplitude. The sensor signal waveform 15 is represented by an amplitude in FIGS. 3 and 4 as well. It is only necessary for the signal amplitude described herein to be a value representing a width of fluctuation of the sensor signal waveform 15.

Figure 5:
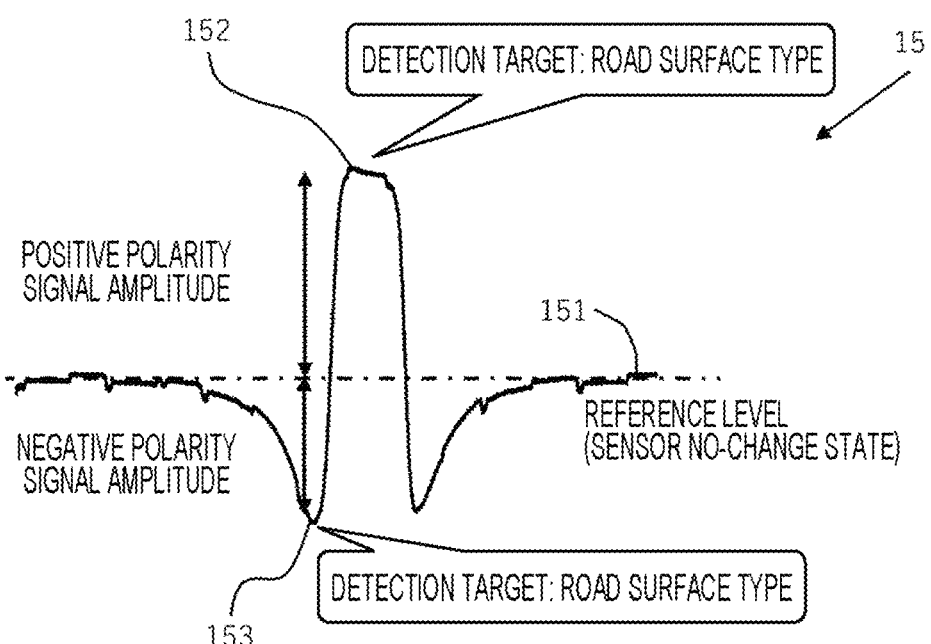
FIG. 5 is an explanatory diagram illustrating a sensor signal waveform of the strain sensor in one cycle according to the first embodiment.

The sensor signal waveform 15 has a waveform in which a falling waveform continues before and after a rising waveform as in FIG. 5. For example, the amplitude of the second falling waveform can be handled as the amplitude of the sensor signal waveform 15. This will now be used as an assumption.

FIG. 5 is an explanatory diagram illustrating the sensor signal waveform 15 of the strain sensor 3 in one cycle according to the first embodiment. FIG. 5 is an enlarged view of the portion A in FIG. 4. As illustrated in FIG. 5, both the peak value 152 at the positive level and the peak value 153 at the negative level include information regarding the road surface type.

<Method for Creating Change Amount Table 5>

FIG. 6 is a flowchart for deriving the change amount table 5 that stores the peak value 153 at the negative level and the peak value 152 at the positive level under each of conditions including the reference conditions of the sensor signal waveform 15 of the strain sensor 3 according to the first embodiment.

As illustrated in FIG. 6, a predetermined control unit for a table creation test causes the vehicle 100 to travel while keeping the reference air pressure, temperature, speed, and amount of load, and acquires outputs of the strain sensors 3 with respect to an asphalt road surface in Step S101. The thus acquired output waveform is a reference waveform.

In Step S102, the predetermined control unit for the table creation test acquires a relationship representing a change in the sensor signal waveform 15 of the strain sensors 3 from the reference waveform when the vehicle 100 is caused to travel on the asphalt road surface while each of the reference air pressure, temperature, speed, and amount of load is made to change therefrom.

In Step S103, the above control unit stores, in the change amount table 5, the reference waveform and the amount of change in the reference waveform for the sensor signal waveform 15 acquired in Step S102.

The change in sensor signal waveform 15 when each condition changes may not necessarily be represented using a difference from the reference waveform and a difference from the reference signal value. However, an absolute value of the signal value differs for each vehicle type or each tire type, it is thus necessary to create data similar to the change amount table 5 in advance for each absolute value, and the amount of data significantly increases. Thus, the amount of data is reduced by describing data using differences from the reference values.

<Change Amount Table 5>

Correlations of the peak value 152 at the positive level of the sensor signal waveform 15 of the strain sensor 3 with the air pressure, the temperature, the speed, and the amount of load are stored in advance in the change amount table 5 while these values are caused to vary.

FIG. 7 is an explanatory diagram of a peak value correction amount air pressure correlation illustrating a correlation between the amount of correction of the peak value at the positive level of the sensor signal waveform 15 of the strain sensor 3 and the air pressure according to the first embodiment. The correlation illustrated in FIG. 7 is a correlation in which the amount of correction of the peak value 152 at the positive level of the sensor signal waveform 15 decreases as the air pressure increases.

Figure 8:
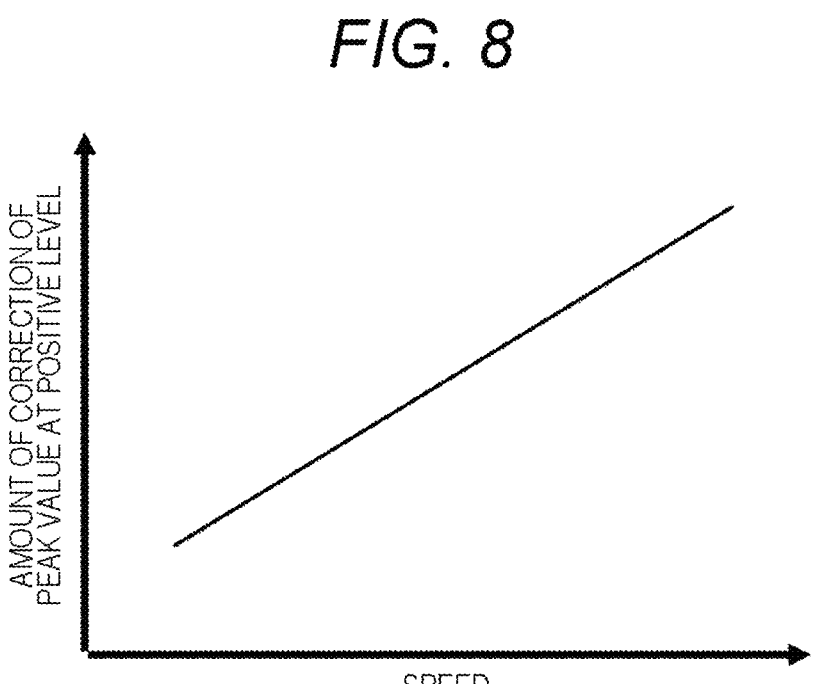
FIG. 8 is an explanatory diagram illustrating a speed correlation table which is a table illustrating a correlation between a peak value at a positive level of a sensor signal waveform of the strain sensor and a speed according to the first embodiment.

FIG. 8 is an explanatory diagram of a peak value correction amount speed correlation illustrating a correlation between the amount of correction of the peak value 152 at the positive level of the sensor signal waveform 15 of the strain sensor 3 and the speed according to the first embodiment.

The correlation illustrated in FIG. 8 is a correlation in which the amount of correction of the peak value 152 at the positive level of the sensor signal waveform 15 increases as the speed increases.

Figure 9:
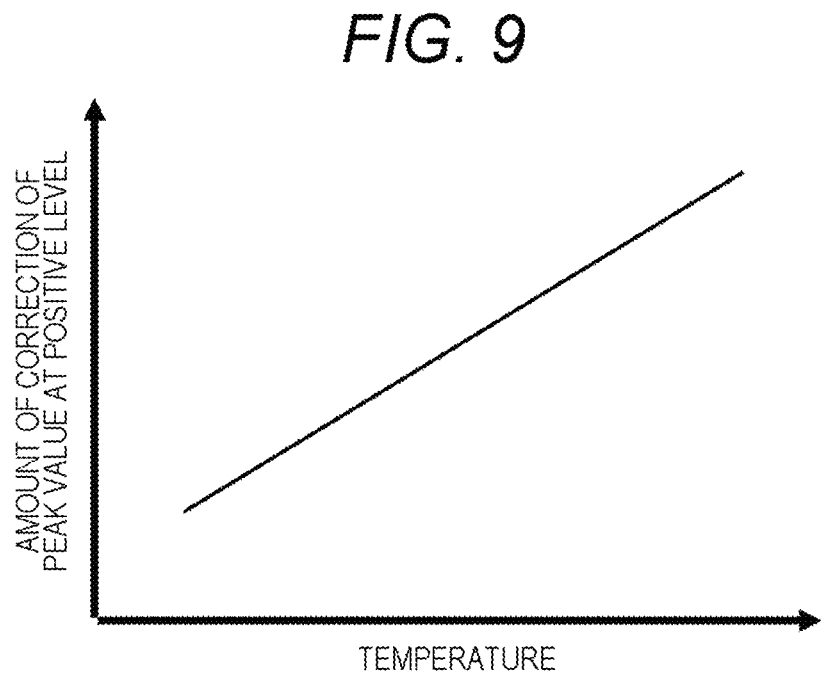
FIG. 9 is an explanatory diagram illustrating a temperature correlation table which is a table illustrating a correlation between a peak value at a positive level of a sensor signal waveform of the strain sensor and a temperature according to the first embodiment.

FIG. 9 is an explanatory diagram of a peak value correction amount temperature correlation illustrating a correlation between the amount of correction of the peak value 152 at the positive level of the sensor signal waveform 15 of the strain sensor 3 and the temperature according to the first embodiment.

The correlation illustrated in FIG. 9 is a correlation in which the amount of correction of the peak value 152 at the positive level of the sensor signal waveform 15 increases as the temperature increases.

Figure 10:
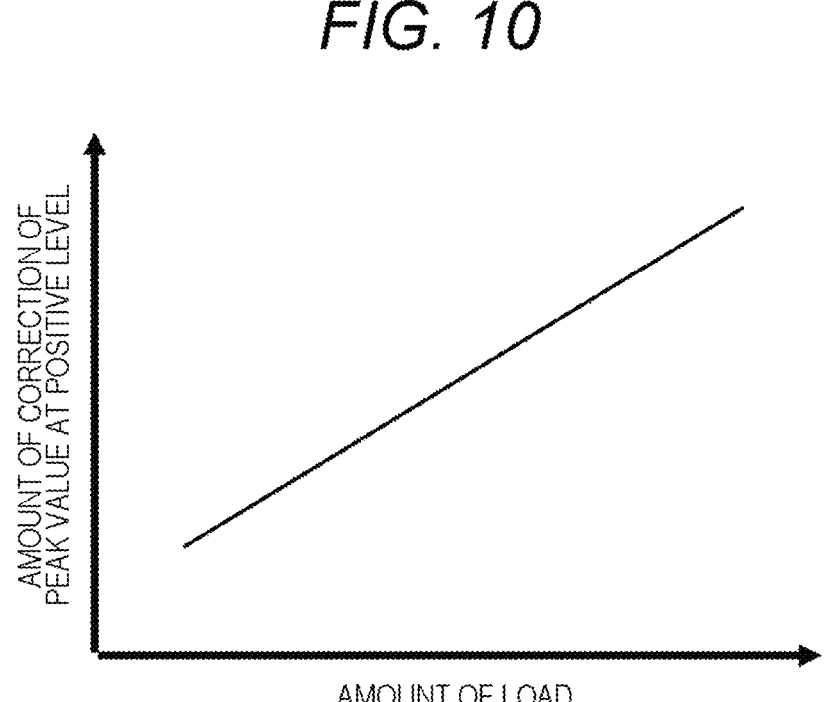
FIG. 10 is an explanatory diagram illustrating a load amount correlation table which is a table illustrating a correlation between a peak value at a positive level of a sensor signal waveform of the strain sensor and an amount of load according to the first embodiment.

FIG. 10 is an explanatory diagram of a peak value correction amount load amount correlation illustrating a correlation between the amount of correction of the peak value 152 at the positive level of the sensor signal waveform 15 of the strain sensor 3 and the amount of load according to the first embodiment. The correlation illustrated in FIG. 10 is a correlation in which the amount of correction of the peak value 152 at the positive level of the sensor signal waveform 15 increases as the amount of load increases.

Figure 11:
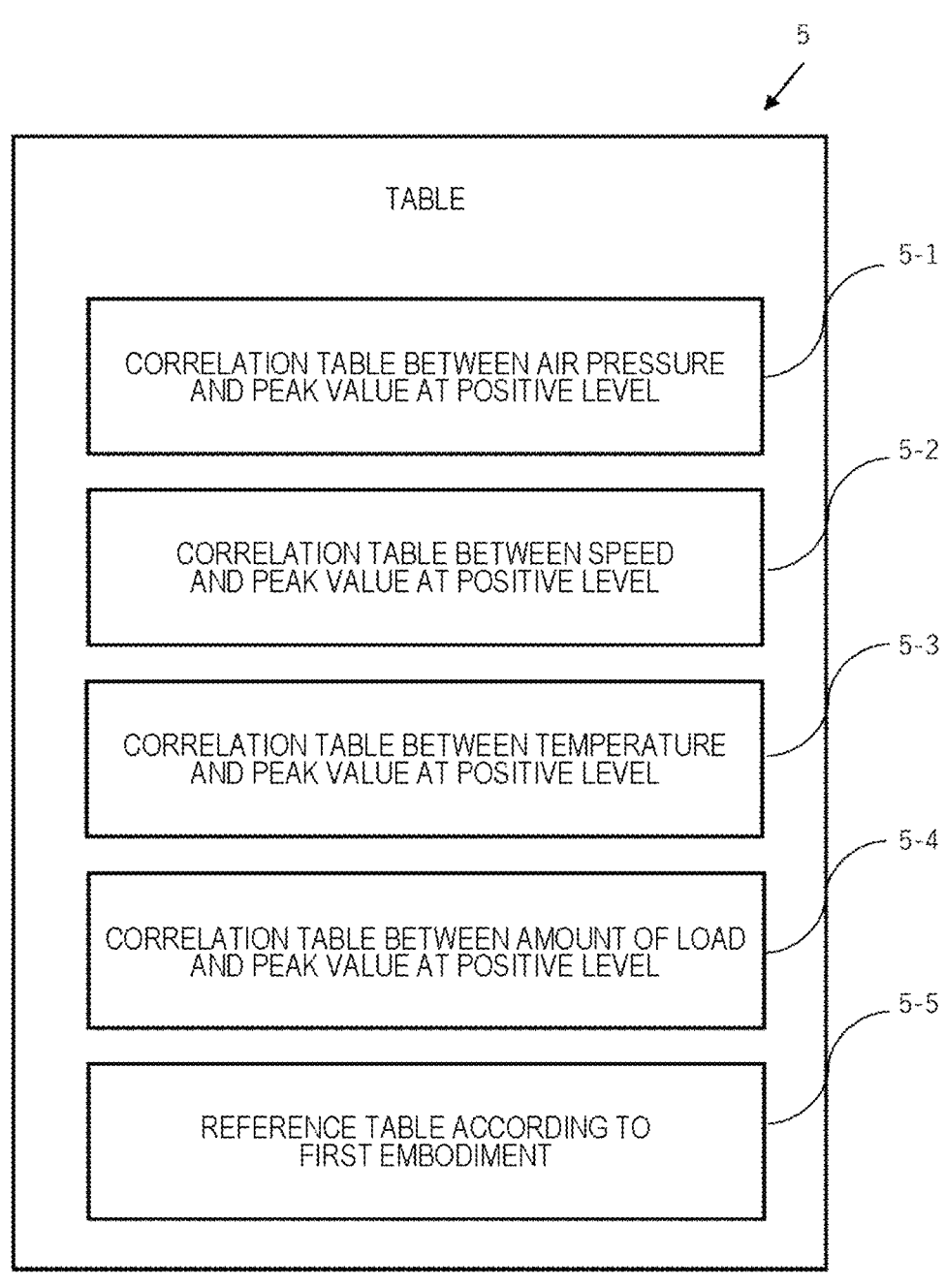
FIG. 11 is an explanatory diagram illustrating a table including various tables according to the first embodiment.

FIG. 11 is an explanatory diagram illustrating the change amount table 5 including various reference tables 5-1 to 5-5 according to the first embodiment. As illustrated in FIG. 11, the change amount table 5 includes the reference table 5-5 according to the first embodiment and the reference tables 5-1 to 5-4 illustrating various correlations in FIGS. 7 to 10. Therefore, it is possible to assess amounts of correction for the peak values 152 at the positive level of the sensor signal waveforms 15 output by the strain sensors 3 in the vehicle 100 traveling on various road surfaces from the change amount table 5 stored in the storage unit 411.

Note that a table for similarly assessing the amount of correction for the peak value 153 at the negative level can also be obtained similarly to the change amount table 5.

<Road Surface Type Detection Method>

Figure 12:
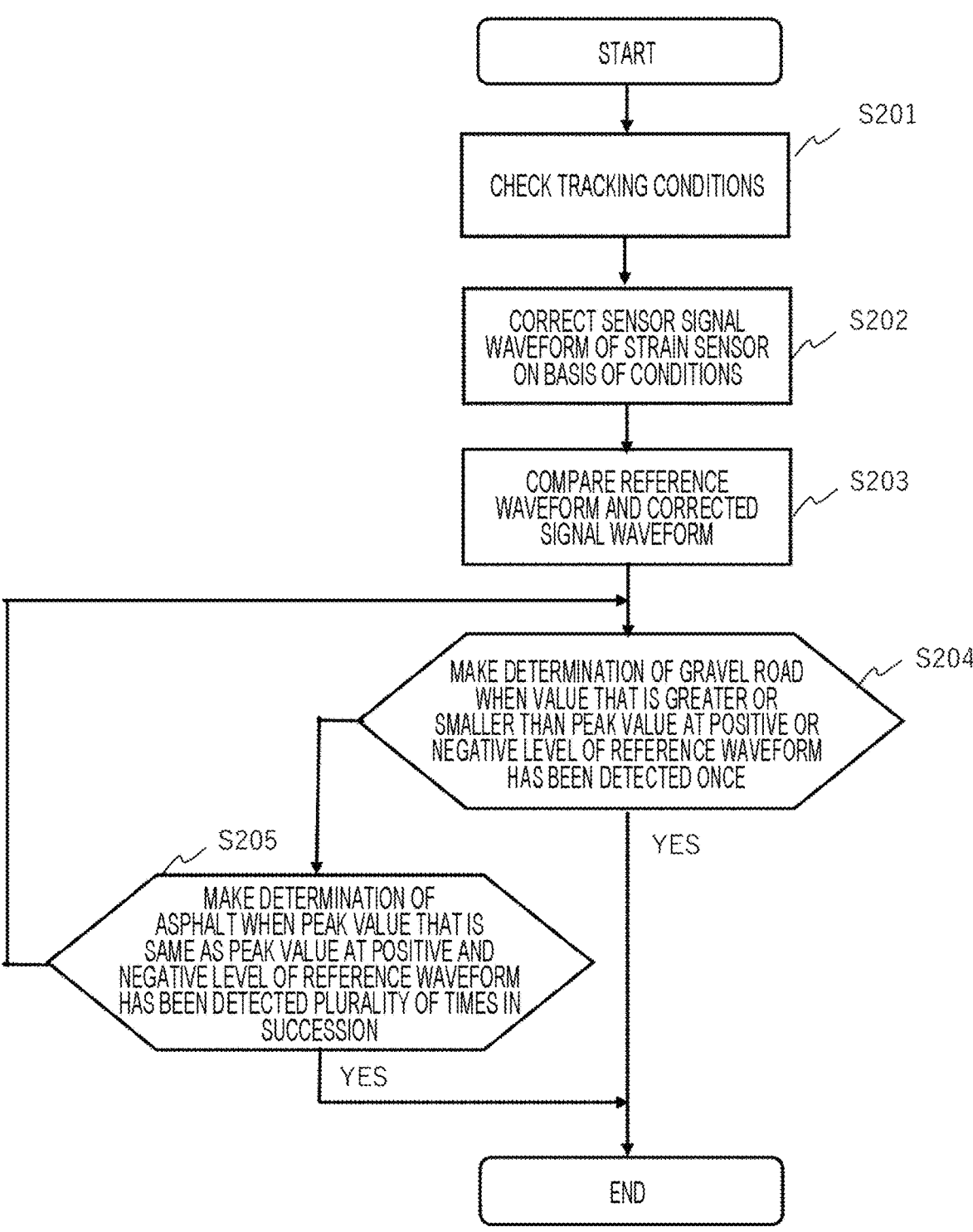
FIG. 12 is a flowchart for estimating a road surface type from a sensor signal waveform of the strain sensor according to the first embodiment.

FIG. 12 is a flowchart for estimating the type of a road surface on which the tires 101 are traveling, from the sensor signal waveform 15 of the strain sensor 3 according to the first embodiment.

The flowchart for the road surface type estimation method illustrated in FIG. 12 is repeatedly executed during traveling of the vehicle 100.

Once the road surface type estimation method is started, the road surface type estimation unit 4 checks traveling conditions in the signal waveform correction unit 412 in the traveling state of the vehicle 100 in Step S201. The traveling conditions are conditions that coincide with traveling conditions when the change amount table 5 is derived.

If the traveling conditions in the signal waveform correction unit 412 are checked in Step S201, then the processing proceeds to Step S202.

In Step S202, the road surface type estimation unit 4 picks up a correction value that meets the conditions stored in the storage unit 411 and obtains a correction signal waveform by subtracting it from the sensor signal waveform 15 in order to correct the sensor signal waveform 15 output by the strain sensor 3 to a signal waveform under the same reference conditions as those for the reference waveform. After the processing in Step S202, the processing proceeds to Step S203.

In Step S203, the road surface type estimation unit 4 compares the peak value of the reference waveform with the peak value 152 at the positive level and the peak value 153 at the negative level of the corrected signal waveform obtained by correcting the sensor signal waveform 15 detected by the strain sensor 3. After the processing in Step S203, the processing proceeds to Step S204.

In Step S204, the road surface type estimation unit 4 determines the road surface type in accordance with the result of comparing the reference waveform with the corrected signal waveform obtained by correcting the detected sensor signal waveform 15 output by the strain sensor 3 in Step S203.

A determination of a gravel road is made in a case in which the peak value of the corrected signal waveform is greater than the positive peak value of the reference waveform or a peak value that is smaller than the negative peak value of the reference waveform has been detected even once.

In this manner, the road surface type estimation unit 4 estimates that the road surface is one of a gravel road. The estimated road surface type is transmitted to the report unit 103. In the case in which a determination of a gravel road is made, the processing end once after the processing in Step S204.

On the other hand, the processing proceeds from Step S204 to Step S205 in a case in which the peak value of the corrected signal waveform that is greater than the positive peak value of the reference waveform or a peak value of the corrected signal waveform that is smaller than the negative peak value of the reference waveform has not been able to be detected even once.

In Step S205, the road surface type estimation unit 4 determines the road surface type in accordance with the result of comparing the reference waveform with the corrected signal waveform in Step S203. In a case in which peak values that are equivalent between the positive or negative peak value of the reference waveform and the peak value of the corrected signal waveform have been detected a plurality of times in succession, the road surface type estimation unit 4 makes a determination of asphalt.

In this manner, the road surface type estimation unit 4 estimates the road surface type as asphalt. The estimated road surface type is transmitted to the report unit 103. In the case in which the road surface type is estimated as asphalt, the processing ends once after the processing in Step S205.

In a case in which the road surface type is not estimated as asphalt in Step S205, the processing returns from Step S205 to Step S204.

<Verification of Road Surface Type Detection Method>

FIG. 13 is a graph illustrating a result of verifying whether or not estimation of a road surface type in accordance with the flowchart in FIG. 12 is possible on the basis of an example of a sensor signal waveform actually measured by the strain sensor 3 according to the first embodiment.

FIG. 13 is a graph illustrating a waveform at the time of traveling on a gravel road surface. It is possible to know that the magnitudes of peaks of the gravel road waveform are characteristic by illustrating a positive peak value and a negative peak value at the time of traveling on an asphalt road surface together as a determination criterion A (illustrated by the one-dotted dashed lines).

It is possible to know that larger peaks and smaller peaks than a determination criterion A coexist in the example illustrated in FIG. 13 and that determination is easily made. It is possible to know that a determination of a gravel road can be made when either the positive peak or the negative peak which is a peak larger or smaller than the determination criterion A has been detected even once, as a determination condition.

FIG. 14 is a waveform at the time of traveling on an asphalt road surface. It is possible to know that both the positive peaks and the negative peaks are repeated at similar levels and that determination can be easily made. It is possible to know that a determination of asphalt can be made as long as it is possible to detect average levels of the positive peaks or the negative peaks about five times in succession, as a determination condition.

Note that an average value of values from the past ten times may be used for the average level determination. Also, any range such as ±10% may be designated as a determination criterion.

<Specific Example of Road Surface Type Detection Logic Flow>

Figures 15A, 15B:
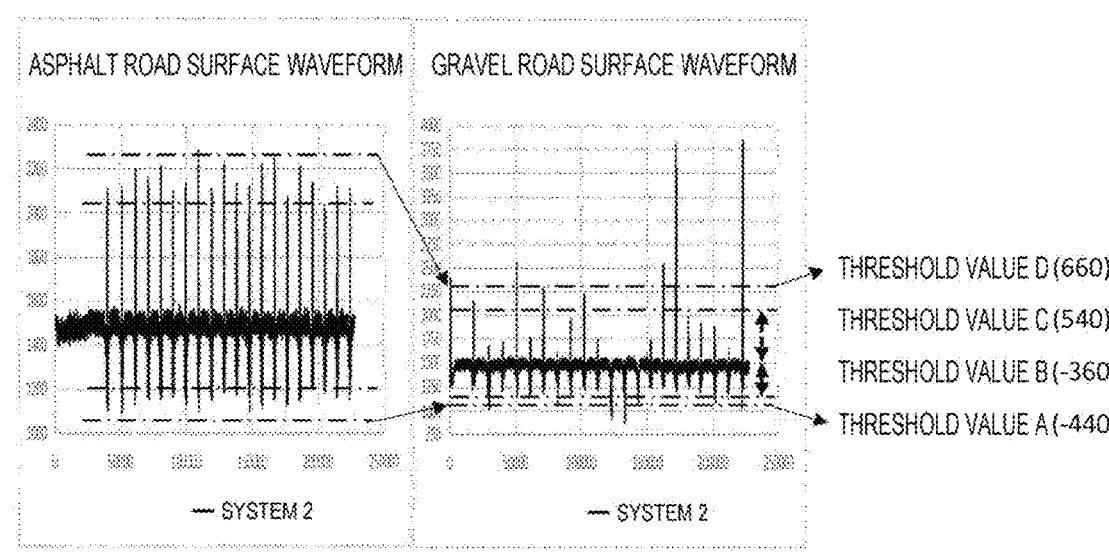
FIG. 15A is an example of a specific road surface type detection logical flow according to the first embodiment.
FIG. 15B is a graph for comparing an asphalt road surface waveform and a gravel road surface waveform.

FIG. 15A is a specific example of a road surface type detection logical flow for the processing in Step S204 and Step S205 (road surface type determination) in the flowchart for the road surface type detection method illustrated in FIG. 12 according to the first embodiment. Note that absolute values are used for comparison of size relationships with the respective threshold values A, B, C, and D.

This is a specific determination logic in a case in which a range designation of ±10% is used for an average level determination criterion in FIG. 14. This is a logic according to which a determination of a gravel road is made when a peak value that is greater or smaller than the asphalt determination criterion has been detected from either the positive peaks or the negative peaks.

Therefore, threshold values A (−440), B (−360), C (−540), and D (660) are set with the asphalt determination criterion designated in the range of ±10%, and the number of times the conditions are satisfied is counted by a counter, and a determination of a gravel road is made in a case in which detection has been made even once. On the other hand, since the peak values are within the asphalt determination range designation in a case in which the above conditions are not met, a determination of an asphalt road surface is made in a case in which this has been detected five times in succession.

FIG. 15B is a graph for comparison between an asphalt road surface waveform and a gravel road surface waveform.

Advantages

As described above, according to the first embodiment, there is an advantage that it is possible to detect a road surface type even in a low-speed range in real time by comparing magnitudes of the reference waveform (asphalt road surface) held in the storage unit 411 and the sensor signal waveform output by the strain sensor 3, and estimating that the road surface type is an asphalt road surface when equivalent magnitudes have been confirmed a plurality of times in succession, or estimating that the road surface type is a gravel road when the magnitude of the sensor signal waveform greater or smaller than the reference waveform has been confirmed at least once.

Since the determination of each road surface type is made depending on how large/small the waveform is, it is only necessary to perform simple operational logic processing, the amount of operation data needed is small, the processing speed can be increased, and it is possible to distinguish the road surface time in real time regardless of whether the vehicle speed is high or low.

Therefore, according to the first embodiment, it is possible to provide a road surface type detection device capable of distinguishing a road surface type in real time even in a low speed range.

Second Embodiment

Next, a second embodiment of the present invention will be described.

Since configurations are similar to those in the first embodiment, configuration diagrams and description will be omitted, and characteristic parts will be described in the following description.

<Road Surface Type Detection Device 10>

Although not illustrated in the drawings, a road surface type detection device 10 according to the second embodiment relates to a driving safety support device for a vehicle 100 similarly to the first embodiment and is particularly for preventing an accident due to insufficient control of a brake and the like before anything happens by providing a safe traveling state.

The road surface type detection device 10 is a device that detects a road surface type that affects gripping forces of tires 101 attached to the vehicle 100, includes strain sensors 3, a road surface type estimation unit 4, and a report unit 103, and detects a road surface type on the basis of an output signal waveform.

<Road Surface Type Detection Method>

Figure 16:
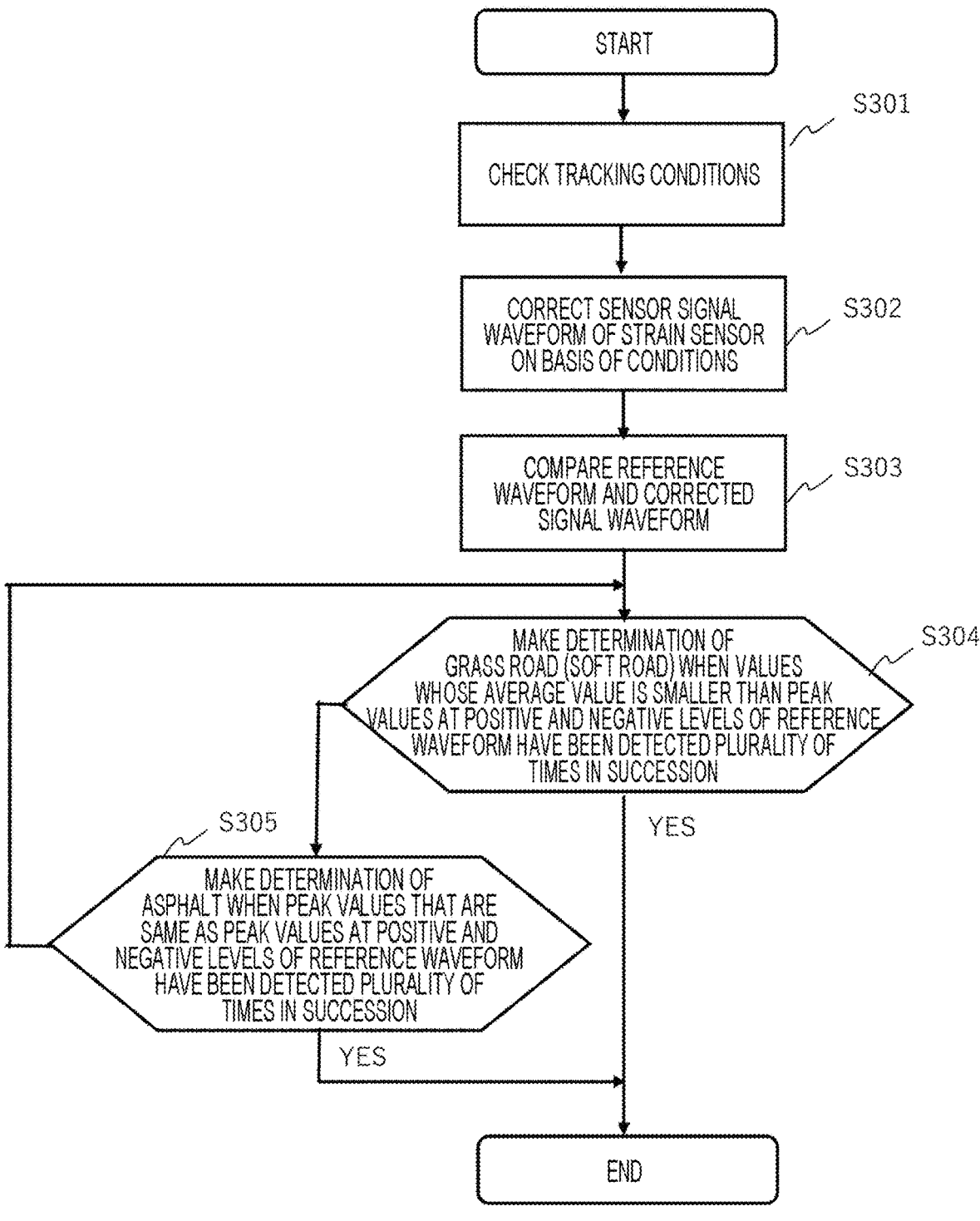
FIG. 16 is a flowchart for estimating a soft road surface from a sensor signal waveform of a strain sensor according to a second embodiment.

FIG. 16 is a flowchart for estimating a type of a road surface on which the tires 101 are traveling from a sensor signal waveform 15 of the strain sensors 3 according to the second embodiment.

The flowchart for the road surface type detection method illustrated in FIG. 16 is repeatedly executed during traveling of the vehicle 100.

Once the road surface type detection method is performed, the road surface type estimation unit 4 checks traveling conditions in the signal waveform correction unit 412 in a traveling state of the vehicle 100 in Step S301. The traveling conditions are conditions that coincide with traveling conditions when a table 5 is derived. If the traveling conditions in the signal waveform correction unit 412 are checked in Step S301, the processing proceeds to Step S302.

In S302, the road surface type estimation unit 4 picks up a correction value in accordance with conditions stored in a storage unit 411, subtracts the correction value from the sensor signal waveform 15, and obtains a corrected signal waveform in order to correct the sensor signal waveform 15 output by the strain sensor 3 to a signal waveform under the same reference conditions as those of the reference waveform. The processing proceeds to Step S303 after the processing in Step S302.

In Step S303, the road surface type estimation unit 4 compares a peak value of the reference waveform with a peak value 152 at a positive level and a peak value 153 at a negative level of the corrected signal waveform obtained by correcting the sensor signal waveform 15 detected by the strain sensor 3. The processing proceeds to Step S304 after the processing in Step S303.

In Step S304, the road surface type estimation unit 4 determines the road surface type in accordance with the result of comparing the reference waveform with the corrected signal waveform obtained by correcting the detected sensor signal waveform 15 output by the strain sensor 3 in Step S303. A determination of a grass road (soft road) is made in a case in which a peak value of the correction signal waveform that is smaller than the positive or negative peak value of the reference waveform within a specific range has been detected even once.

In this manner, the road surface type estimation unit 4 determines that the road surface is a grass road. The estimated road surface type is transmitted to the report unit 103. In a case in which a determination of a grass road is made in the processing in Step S304, the processing ends once. Note that the condition for the detection determination may be changed from once to a plurality of times in succession.

On the other hand, in a case in which the peak value of the corrected signal waveform that is smaller than the positive peak value 152 or the negative peak value 153 of the reference waveform within the specific range has not been able to be detected even once in Step S304, the processing proceeds to Step S305.

In Step S305, the road surface type estimation unit 4 determines the road surface type in accordance with the result of comparing the reference waveform with the corrected signal waveform in Step S303. In a case in which peak values that are equivalent between the positive peak value 152 or the negative peak value 153 of the reference waveform and the peak value of the corrected signal waveform have been detected a plurality of times in succession, the road surface type is determined to be asphalt.

In this manner, the road surface type estimation unit 4 estimates the road surface type as asphalt. The estimated road surface type is transmitted to the report unit 103. In a case in which the road surface type is determined to be asphalt in the processing in Step S305, the processing ends once. In a case in which the road surface type is not determined to be asphalt in the processing in Step S305, the processing returns to Step S304.

<Verification of Road Surface Type Detection Method>

Figure 17:
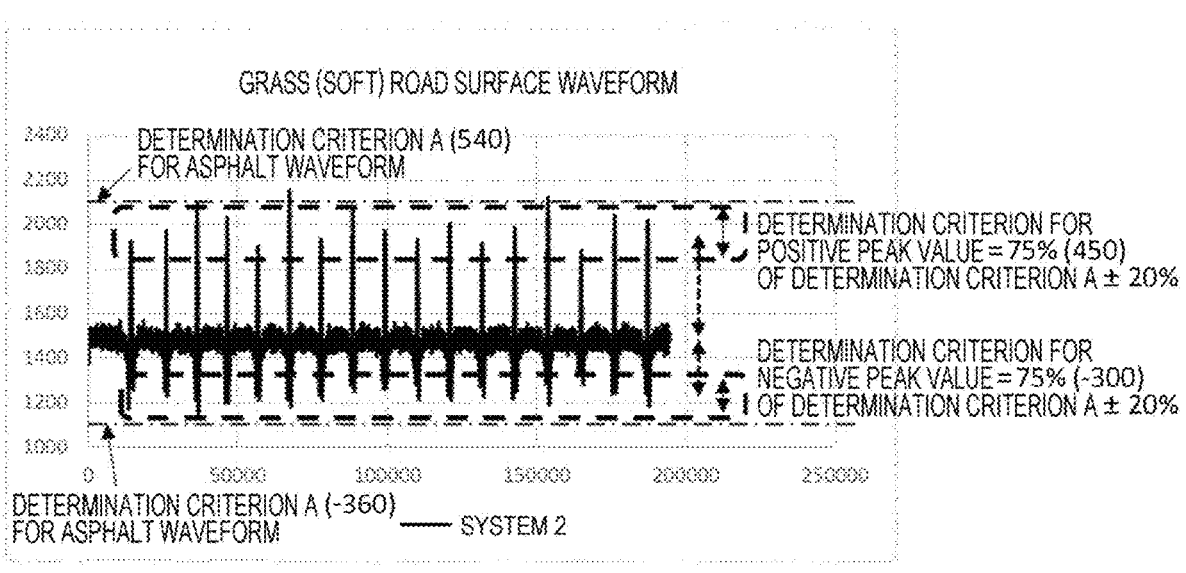
FIG. 17 is a graph illustrating a result of verifying whether or not the road surface type estimation flowchart is possible on the basis of an actually measured sensor signal waveform of a soft road surface from the strain sensor according to the second embodiment.

FIG. 17 is a diagram illustrating a result of verifying whether or not road surface type estimation in accordance with the flowchart in FIG. 16 is possible on the basis of an example of a sensor signal waveform actually measured by the strain sensor 3 according to the second embodiment. FIG. 17 illustrates a waveform at the time of traveling on a grass road surface.

If a positive peak value and a negative peak value at the time of traveling on an asphalt road surface are illustrated together as determination criterion A (one-dotted dashed lines), it is possible to know that there are features in magnitudes of the peaks of the grass road waveform.

In the case of the grass road, peaks are smaller than the determination criterion A in average, and it is possible to know that the determination of the grass road can be easily made. It is possible to know that the determination of the grass road can be made when the positive peak or the negative peak which is a peak smaller than the determination criterion A within a specific range has been detected even once, as a determination condition.

Note that an average value of values from the past ten times may be used for the average level determination. Also, any range such as 75% of the reference waveform±10% may be designated for the determination criterion.

<Specific Example of Road Surface Type Detection Logic>

Figure 18:
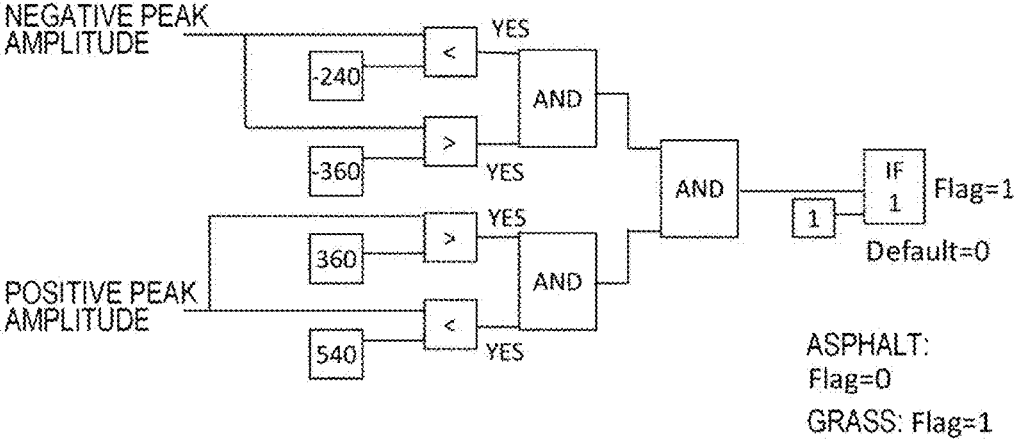
FIG. 18 is an example of a specific road surface type detection logic according to the second embodiment.

FIG. 18 is a specific example of the road surface type detection logic for the processing in Step S304 and Step S305 (road surface type determination) in the flowchart for the road surface type detection method illustrated in FIG. 16 according to the second embodiment. This is a specific determination logic in the case in which the range designation of ±10% is used for the average level determination in FIG. 17. This is a logic of making a determination of a grass road when both the positive peak and the negative peak are smaller than the asphalt determination criterion and the peak values have been detected within the range of ±10%.

Therefore, threshold values are set on the basis of the asphalt determination criteria (+540 and −360) and the range of +10% (+360 and −240), and a determination of a grass road is made when the conditions are met.

Advantages

As described above, according to the second embodiment, there is an effect that it is possible to detect road surface types other than asphalt and a gravel road in real time even in a low-speed range by comparing the magnitudes of the reference waveform (asphalt) held in the storage unit 411 and the sensor signal waveform output by the strain sensor 3 and estimating a grass road when the magnitude of the sensor signal waveform is smaller than the reference waveform and the peak value has been detected within the designated range once or a plurality of times in succession.

Therefore, according to the second embodiment, it is possible to provide a road surface type detection device capable of distinguishing a road surface type in real time even in a low-speed range similarly to the first embodiment.

Third Embodiment

Next, a third embodiment of the present invention will be described.

Figure 19A:
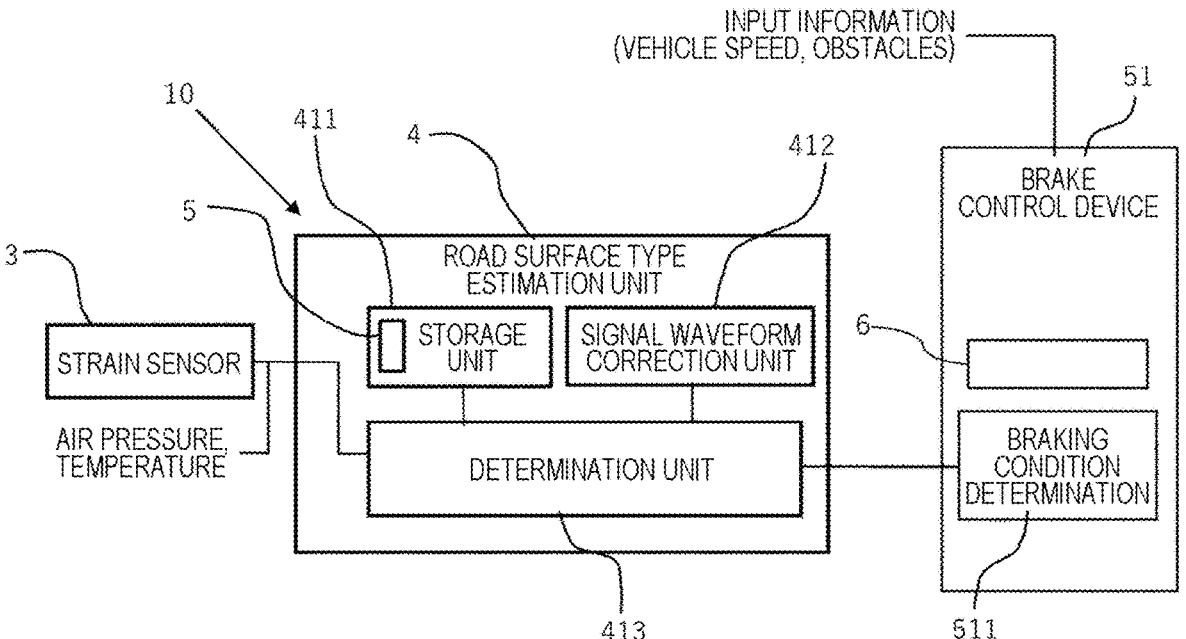
FIG. 19A is a configuration diagram illustrating a brake control system according to a third embodiment.

FIG. 19A is a diagram illustrating a configuration example of a brake control system 20 according to a third embodiment of the present invention. FIG. 19A is an image diagram in which the road surface type detection device 10 according to the first embodiment or the second embodiment is applied to a brake control system 20 for a vehicle.

The brake control system 20 includes a brake control device 51 and a road surface type detection device 10.

The road surface type detection device 10 relates to a driving safety support device for a vehicle 100 similarly to the first embodiment and is particularly a device for preventing accident caused by insufficient control of a brake before anything happens by providing a safe traveling state.

The road surface type detection device 10 is a device that detects a road surface type that affects gripping forces of tires 101 attached to the vehicle 100, includes strain sensors 3, a road surface type estimation unit 4, and a brake control device 51, and is configured to send an estimation result of a road surface type to a braking condition determination unit 511 inside the brake control device 51 on the basis of an output signal waveform and determine a braking condition inside the system.

Figure 19B:
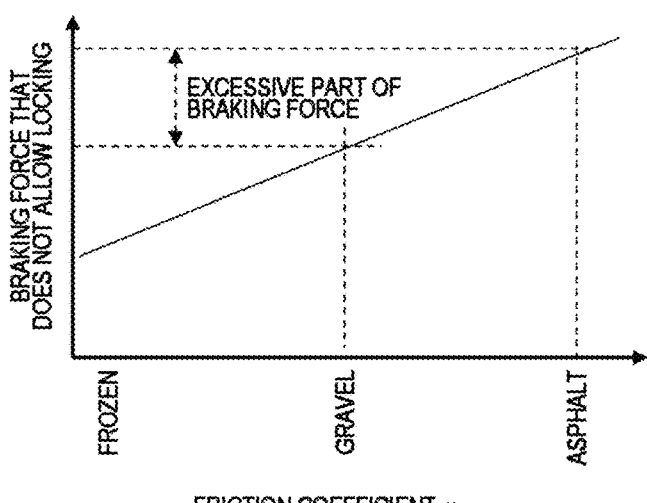
FIG. 19B is a graph illustrating a relationship of a braking force that does not allow locking with respect to a road surface type and a road surface resistivity according to the third embodiment.

FIG. 19B is a graph illustrating a relationship of a braking force that does not allow locking with respect to a road surface type and a road surface resistivity according to the third embodiment of the present invention.

The vertical axis in FIG. 19B represents the braking force that does not allow locking, and the horizontal axis represents a friction coefficient $\mu$. The friction coefficient $\mu$ is the smallest for a frozen road surface and is the largest for asphalt in comparison of the frozen road surface, a gravel road, and the asphalt. The friction coefficient $\mu$ of the gravel road is substantially intermediate between the frozen road surface and the asphalt. The braking force that does not allow locking increases as the friction coefficient $\mu$ increases.

If a brake is stepped on with a braking force assuming asphalt at the time of a gravel road, for example, a locked state is achieved, locking avoidance is repeated by an ABS, and a braking distance is thus extended.

On the other hand, if a gravel road can be determined, it is possible to perform control with the braking force that does not allow locking from the beginning and thereby to efficiently apply braking. In other words, the brake system can perform brake control suitable for the road surface by detecting a change in road surface.

A relationship between the friction coefficient $\mu$ and the braking force that does not allow wheels to be locked as illustrated in FIG. 19B is stored in a wheel locking condition table 6 included in the brake control device 51.

The determination unit 413 calculates the friction coefficient $\mu$ of the road surface and outputs the friction coefficient $\mu$ to the braking condition determination unit 511. The braking condition determination unit 511 determines the braking force that does not allow the wheels to be locked from the relationship between the friction coefficient $\mu$ and the braking force that does not allow the wheels to be locked that is stored in the wheel locking condition table 6. The brake control device 51 controls the brake to achieve the braking force determined by the braking condition determination unit 511 as input information of a vehicle speed and obstacle information.

Advantages

As described above, there is an advantage that it is possible to perform brake control with high precision and it is possible to perform safer brake control by applying the road surface type detection device 10 according to the third embodiment of the present invention to the brake control system 20. As an embodiment other than the aforementioned embodiments, there is an example in which the road surface type determination flow (FIG. 12) in the first embodiment and the road surface type determination flow (FIG. 16) in the second embodiment are combined to determine three road surface types, namely asphalt, a grass road, and a gravel road.

Note that the present invention is not limited to the aforementioned embodiments and includes various modification examples. For example, some of configurations in a certain embodiment can be replaced with configurations in another embodiment, and configurations in another embodiment can be added to configurations in a certain embodiment. Moreover, it is possible to perform addition, deletion, and replacement of some of configurations in each embodiment with configurations of another embodiment.

Also, although the aforementioned embodiments are configured such that any one road surface type out of the plurality of road surface types is estimated from a waveform of a sensor signal output by the strain sensor 3, it is also possible to employ a configuration in which any one road surface type out of the plurality of road surface types is estimated from a waveform of a sensor signal output by the air pressure sensor 1 or the temperature sensor 2 similarly to the processing of the output signal waveform from the strain sensor 3. The air pressure sensor 1, the temperature sensor 2, and the strain sensor 3 can be collectively referred to as sensor elements that detect the physical amounts of the vehicle.

REFERENCE SIGNS LIST

1 air pressure sensor
2 temperature sensor 3 strain sensor
4 road surface type estimation unit
5 change amount table
5-1 to 5-4 correlation table
5-5 reference table
6 wheel locking condition table
10 road surface type detection device
20 brake control system
15 sensor signal waveform
51 brake control device
100 vehicle
101 tire
102 ECU
103 report unit
151 reference level
152 peak value at positive level
153 peak value at negative level
411 storage unit
412 signal waveform correction unit
413 determination unit
511 braking condition determination unit

The invention claimed is:

1. A road surface type detection device that estimates a plurality of road surface types, the road surface type detection device comprising:

at least one sensor element that detects a physical amount of a vehicle;

a road surface type estimation unit;

a storage unit that stores output values of the sensor element corresponding to the plurality of road surface types, wherein the storage unit further stores, as a magnitude of a reference waveform, a magnitude of a waveform of asphalt that is one road surface type out of the plurality of road surface types; and a determination unit that determines any one road surface type out of the plurality of road surface types based on a magnitude of a waveform of a sensor signal output by the sensor element, wherein the determination unit is configured to:

compare the magnitude of the waveform of the sensor signal output by the sensor element with the magnitude of the reference waveform, in response to a determination that the magnitude of the waveform of the sensor signal output is equivalent to the magnitude of the reference waveform in a plurality of times in succession, determine that a first road surface type is asphalt, in response to a determination that the magnitude of the waveform of the sensor signal output is greater than the magnitude of the reference waveform by a specific amount at least once or is smaller than the magnitude of the reference waveform by a specific amount at least once, determine that a second road surface type is gravel, and in response to a determination that the magnitude of the waveform of the sensor signal output is smaller than the magnitude of the reference waveform by a specific amount in a plurality of times in succession, determine a third road surface type is grass.

2. The road surface type detection device according to claim 1, wherein the determination unit makes a determination of another road surface type out of the plurality of road surface types when a case in which the magnitude of the waveform of the sensor signal output is greater than the magnitude of the reference waveform by a specific amount or is smaller than the magnitude of the reference waveform by a specific amount is confirmed at least once.

3. The road surface type detection device according to claim 1, wherein the determination unit makes a determination of another road surface type out of the plurality of road surface types when cases in which the magnitude of the waveform of the sensor signal output is smaller than the magnitude of the reference waveform by a specific amount are confirmed a plurality of times in succession.

4. The road surface type detection device according to claim 1, wherein the sensor element is a strain sensor element.

5. A brake control system comprising:

a road surface type detection device including:

at least one sensor element that detects a physical amount of a vehicle, a road surface type estimation unit, a storage unit that stores output values of the sensor element corresponding to a plurality of road surface types, wherein the storage unit further stores, as a magnitude of a reference waveform, a magnitude of a waveform of asphalt that is one road surface type out of the plurality of road surface types; and a determination unit that determines any one road surface type out of the plurality of road surface types based on a magnitude of a waveform of a sensor signal output by the sensor element, wherein the determination unit is configured to:

compare the magnitude of the waveform of the sensor signal output by the sensor element with the magnitude of the reference waveform, in response to a determination that the magnitude of the waveform of the sensor signal output is equivalent to the magnitude of the reference waveform in a plurality of times in succession, determine that a first road surface type is asphalt, in response to a determination that the magnitude of the waveform of the sensor signal output is greater than the magnitude of the reference waveform by a specific amount at least once or is smaller than the magnitude of the reference waveform by a specific amount at least once, determine that a second road surface type is gravel, and in response to a determination that the magnitude of the waveform of the sensor signal output is smaller than the magnitude of the reference waveform by a specific amount in a plurality of times in succession, determine a third road surface type is grass, and a brake control device that includes a braking condition determination unit that determines a braking condition of the vehicle based on a road surface type determined by the road surface type detection device, the brake control device controlling a braking force of the vehicle.

6. The brake control system according to claim 5, wherein the brake control device includes a wheel locking condition table that stores relationships between friction coefficients of the road surface types and a braking force that does not allow wheels of the vehicle to be locked, the brake control device controlling a braking force of the vehicle to be the braking force that does not allow the wheels to be locked in accordance with the road surface types.

* * * * *